(12) United States Patent
Tseng

(10) Patent No.: US 9,797,491 B2
(45) Date of Patent: Oct. 24, 2017

(54) ELECTRIC ACTUATOR ASSEMBLY

(71) Applicant: MOTECK ELECTRIC CORP., New Taipei (TW)

(72) Inventor: Hsien-Te Tseng, New Taipei (TW)

(73) Assignee: MOTECK ELECTRIC CORP., New Taipei (TW)

( * ) Notice: Subject to any disclaimer, the term of this patent is extended or adjusted under 35 U.S.C. 154(b) by 379 days.

(21) Appl. No.: 14/682,575

(22) Filed: Apr. 9, 2015

(65) Prior Publication Data

US 2015/0337930 A1 Nov. 26, 2015

(30) Foreign Application Priority Data

May 22, 2014 (TW) .............................. 103208960 U

(51) Int. Cl.
*F16H 25/24* (2006.01)
*B60T 17/22* (2006.01)
*F16H 25/20* (2006.01)

(52) U.S. Cl.
CPC .......... *F16H 25/2454* (2013.01); *B60T 17/22* (2013.01); *F16H 2025/209* (2013.01); *F16H 2025/2046* (2013.01); *F16H 2025/2084* (2013.01); *Y10T 74/18704* (2015.01)

(58) Field of Classification Search
CPC .................... F16H 25/2454; F16H 2025/2046
See application file for complete search history.

(56) References Cited

U.S. PATENT DOCUMENTS

| | | | | | |
|---|---|---|---|---|---|
| 4,747,319 | A | * | 5/1988 | Sakuta | B62D 33/07 74/411.5 |
| 7,347,115 | B2 | * | 3/2008 | Otaki | B60T 13/746 74/89.37 |
| 2010/0319477 | A1 | * | 12/2010 | Tateishi | F16H 25/2454 74/411.5 |
| 2011/0067961 | A1 | * | 3/2011 | Duits | F16D 63/006 188/82.84 |
| 2016/0146317 | A1 | * | 5/2016 | Tseng | F16H 25/2454 74/89.37 |

* cited by examiner

*Primary Examiner* — Terence Boes
(74) *Attorney, Agent, or Firm* — Muncy, Geissler, Olds & Lowe, P.C.

(57) ABSTRACT

An electric actuator assembly comprises a main actuator including a gear set containing a stepped friction portion located on a gear shaft of a drive gear thereof, an extension rod, and a power drive for rotating the gear set to move the extension rod through a lead screw, and a one-way bearing consisting of an inner race fitted to the gear shaft of the drive gear, an outer race surrounding the inner race, and a backstop mechanism mounted in between. When operating the power drive to rotate the gear set in lifting the extension rod, the inner race is rotated by the gear set relative to the outer race in one direction. When the driving power is off, the one-way bearing cannot rotate in reverse direction, the stepped friction portion is abutted against the flat contact surface of the inner race to produce a braking effect, preventing falling of the load that is supported on the main actuator.

9 Claims, 6 Drawing Sheets

ELECTRIC ACTUATOR ASSEMBLY

This application claims the priority benefit of Taiwan patent application number 103208960, filed on May 22, 2014.

BACKGROUND OF THE INVENTION

1. Field of the Invention

The present invention relates to electric actuator technology, and more particularly to an electric actuator assembly, which comprises a one-way bearing to provide a braking effect when the driving power is off, preventing falling of the load and assuring the operational safety.

2. Description of the Prior Art

Electric actuators with different mechanical designs and transmission mechanisms are widely used in electric beds, electric massage chairs, patient lifts, fitness machines, and rehabilitation machines. These electric actuators commonly use a motor to drive a transmission mechanism, causing an extension rod to extend or to retract for adjustment of the elevation or angle of the electric bed, electric massage chair, etc.

The power transmission of electric actuator conventionally consists of a worm and a worm gear for delivering the driving power of a motor to rotate the lead screw, moving the extension rod linearly to lift or lower a connecting part or supporting frame of a mechanism. Normally, the worm is made of metal, and the worm gear is made from a plastic material. When the driving power is off, the gravity of the load can force the lead screw to rotate in the reversed direction, causing falling of the connecting part or supporting frame of the lifting mechanism. In order to eliminate this problem, a brake mechanism is normally used for holding the connecting part or supporting frame of the lifting mechanism in position when the driving power is off. However, this brake mechanism occupies much installation space, affects spatial arrangement of other components, even redesigning for the specification and tooling, and results in restricting the application flexibility and increasing the manufacturing cost of the electric actuator. An improvement in this regard is desired.

SUMMARY OF THE INVENTION

The present invention has been accomplished under the circumstances in view. It is one object of the present invention to provide an electric actuator assembly, which uses a one-way bearing to provide a braking effect when the driving power is off, preventing falling of the load.

To achieve this and other objects of the present invention, an electric actuator assembly comprises a main actuator and a one-way bearing. The main actuator includes a housing defining an accommodation chamber therein and two openings in opposing top and bottom sides thereof, a gear set mounted in the accommodation chamber inside the housing, a power drive installed for rotating the gear set, a transmission mechanism comprising a lead screw coupled to and rotated by the gear set, and an extension rod mated with the lead screw and linearly movable upon rotation of the lead screw. The gear set comprises a drive gear which contains a gear shaft axially and concentrically extended out of two opposite sides thereof, and at least one stepped friction portion located on the periphery thereof. The one-way bearing is mounted in the accommodation chamber inside the housing of the main actuator, consisting of an inner race fitted to the gear shaft of the drive gear, an outer race surrounding the inner race, and a backstop mechanism mounted in between the inner race and the outer race. The inner race comprises a flat contact surface located at a top side thereof for abutting against the at least one stepped friction portion. When operating the power drive to rotate the gear set in lifting the extension rod, the inner race is rotated by the gear set relative to the outer race in one direction. When the driving power is off, the at least one stepped friction portion is abutted against the flat contact surface to produce a braking effect, preventing falling of the load that is supported on the electric actuator.

Other advantages and features of the present invention will be fully understood by reference to the following specification in conjunction with the accompanying drawings.

DETAILED DESCRIPTION OF THE PREFERRED EMBODIMENT

Figure 1:
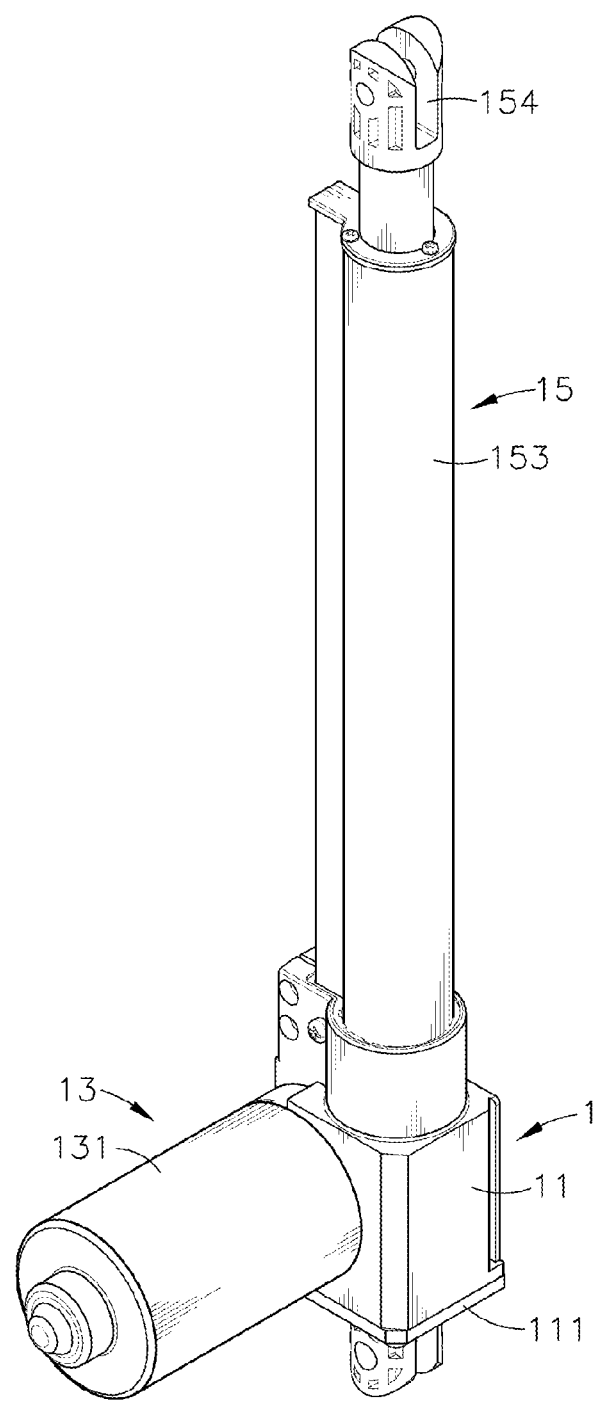
FIG. 1 is a perspective view of an electric actuator assembly in accordance with the present invention.
Figure 2:
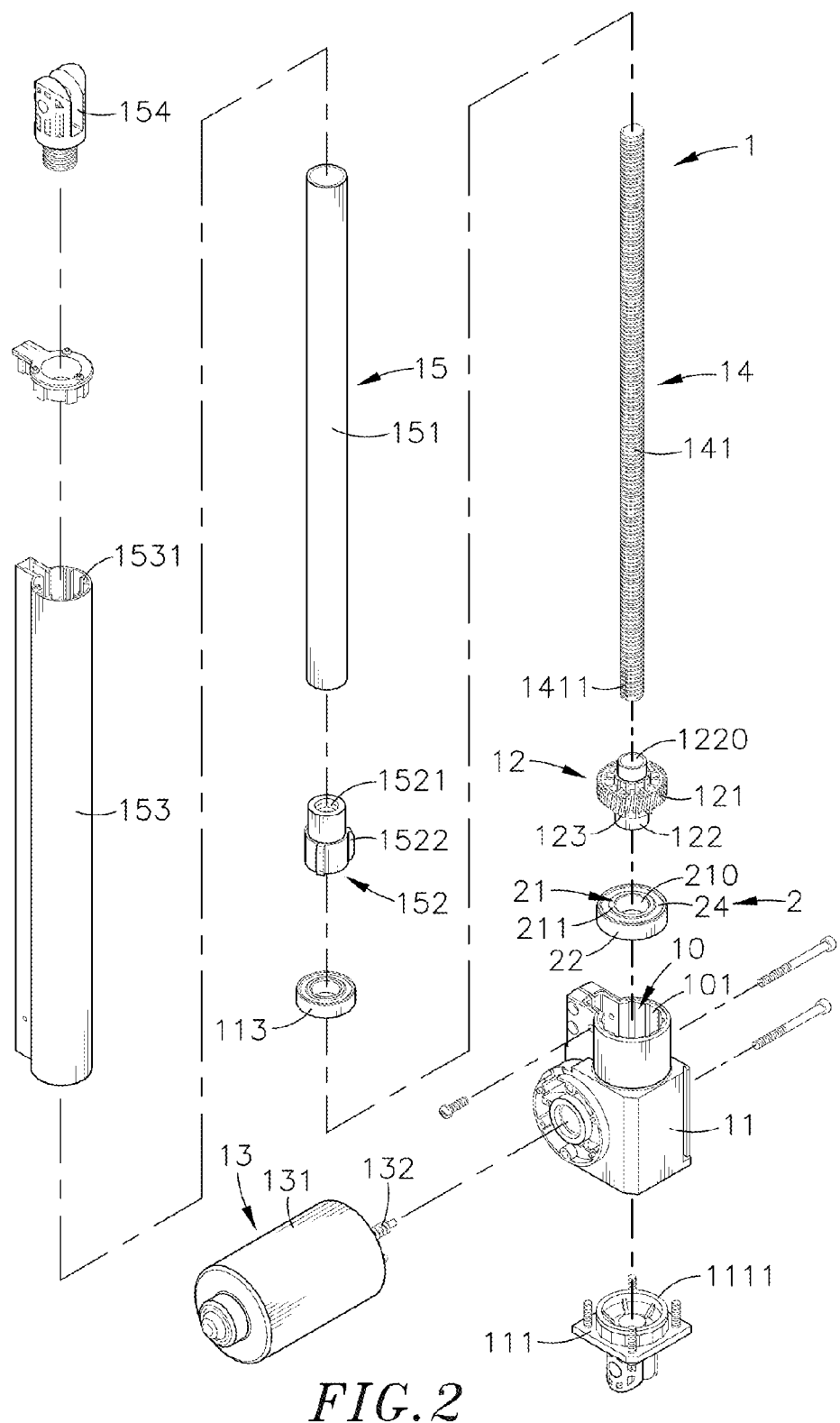
FIG. 2 is an exploded view of the electric actuator assembly in accordance with the present invention.
Figure 3:
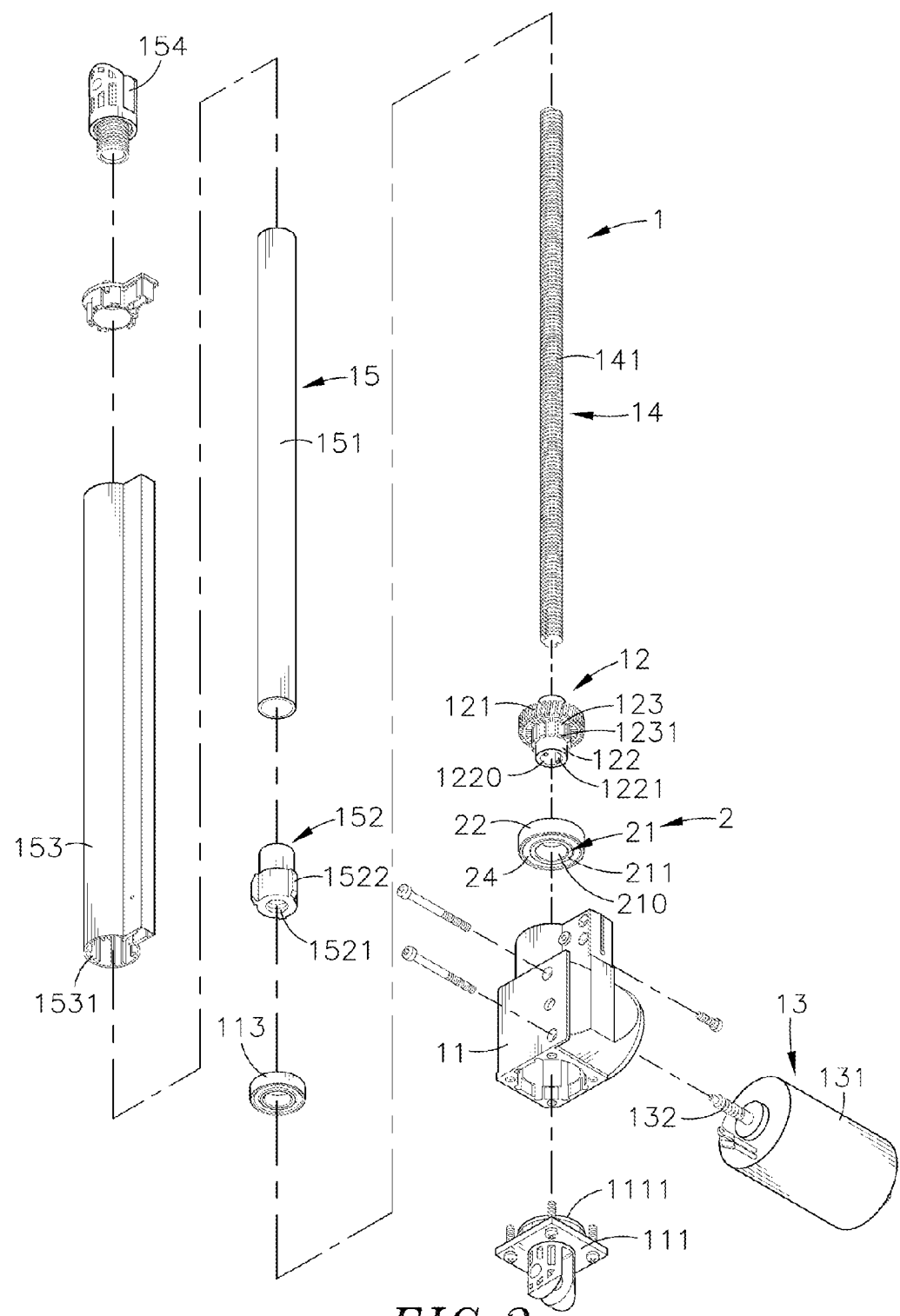
FIG. 3 corresponds to FIG. 2 when viewed from another angle.
Figure 4:
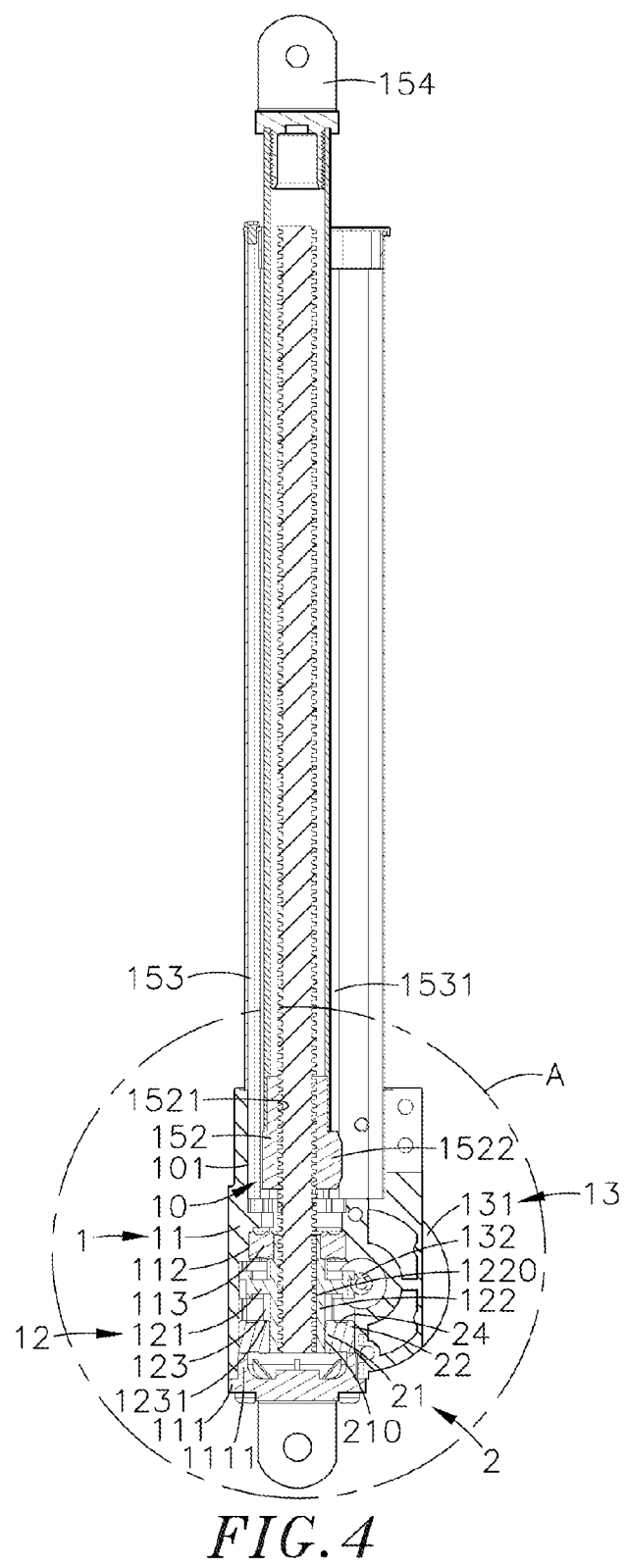
FIG. 4 is a sectional view of the electric actuator assembly in accordance with the present invention.
Figure 5:
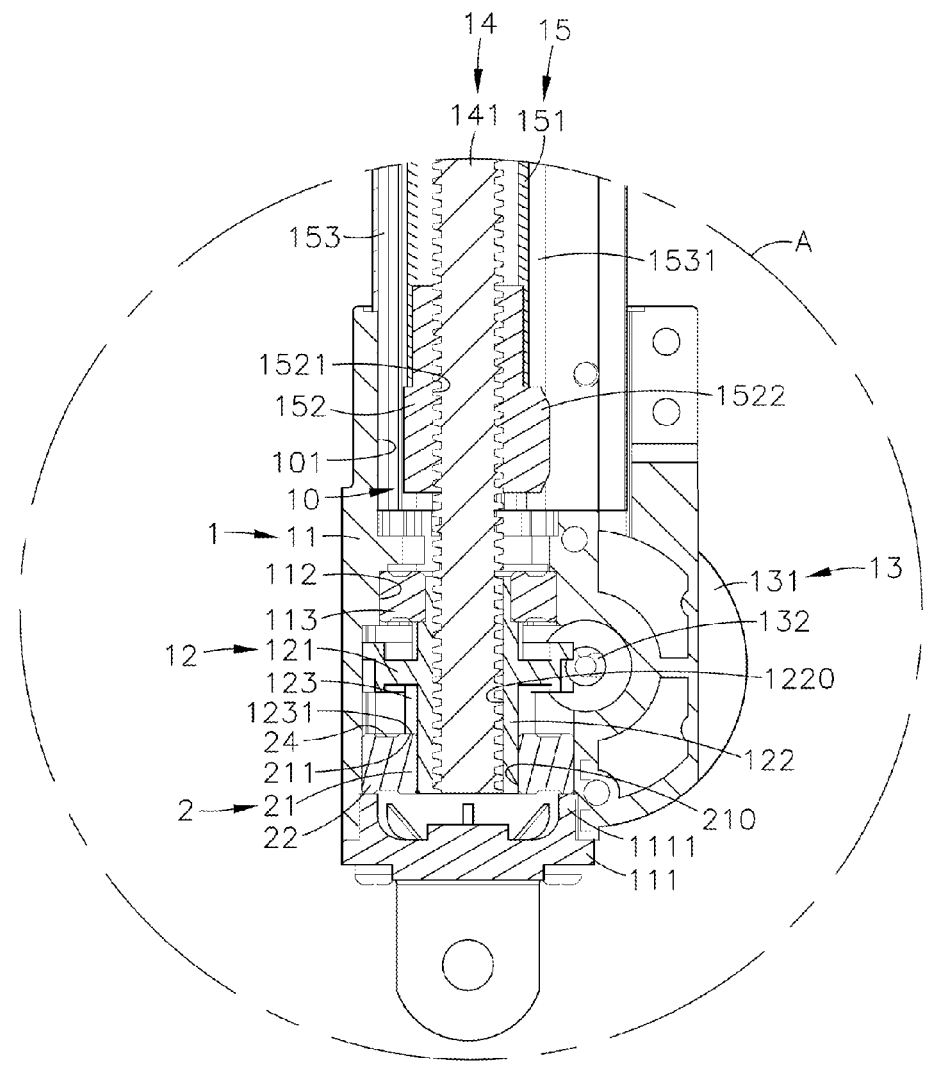
FIG. 5 is an enlarged view of Part A of FIG. 4.
Figure 6:
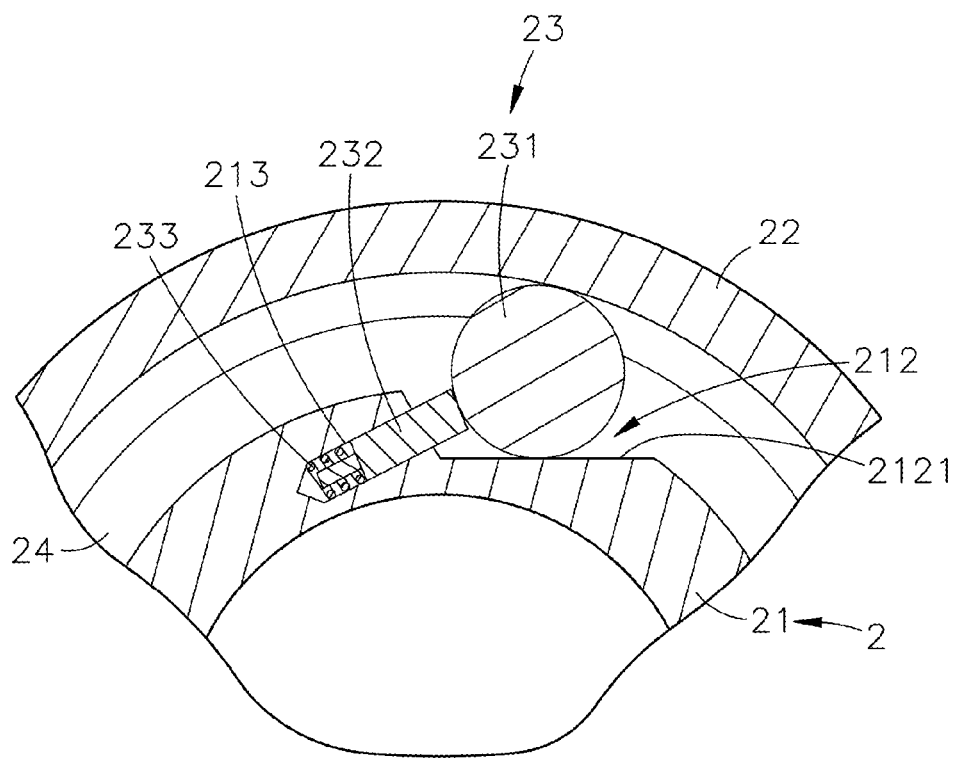
FIG. 6 is a schematic sectional view of a part of the present invention, illustrating the structure of the one-way bearing.

Referring to FIGS. 1-6, an electric actuator assembly in accordance with the present invention is shown. The electric actuator assembly comprises a main actuator 1 and a one-way bearing 2. The main actuator 1 including a housing 11, a gear set 12, a power drive 13, a transmission mechanism 14, and an extension rod 15 will be explained in detail below.

The housing 11 comprises an accommodation chamber 10 defined therein and two openings 101 respectively located in opposing top and bottom sides thereof, a first connection fitting 111 which is affixed to the bottom side of the housing 11 with screws and comprising a tubular flange 1111 fitted into the bottom opening 101, a locating groove 112 extending around a middle part of an inner perimeter thereof in the accommodation chamber 10, and an axle bearing 113 mounted in the locating groove 112. The gear set 12 comprises a plastic drive gear (for example, worm gear) 121 mounted in the accommodation chamber 10. While the drive gear 121 contains a gear shaft 122 axially and concentrically extended out of two opposite sides of the drive gear 121 and upwardly inserted with a top end thereof into the axle bearing 113, an axial hole 1220 extending through the gear shaft 122, a plurality of engagement blocks 1221 equiangularly located in the gear shaft 122 near the bottom end thereof and radially projecting into the axial hole 1220, at least one stepped friction portion 123 located on the periphery of the gear shaft 122 and adjacent to the drive gear 121, and a flat abutment surface 1231 adjacent to each stepped friction portion 123. The power drive 13 consists of a motor 131 fixedly mounted on the outside of the housing 11 and an output shaft (for example, worm) 132 inserted into the housing 11 and meshed with the drive gear 121 and driven by the motor 131. The transmission mechanism 14 comprises a lead screw 141 inserted into the axial hole 1220 of the drive gear 121 and a plurality of coupling grooves 1411 equiangularly located in the periphery of a bottom end of the lead screw 141 and fitted in with the engagement blocks 1221. An extension rod 15 includes an inner tube 151 accommodated in an outer tube 153 which is fixedly mounted in the housing 11, a plurality of longitudinally extended sliding grooves 1531 formed on an interior surface of the outer tube 153 therein, a second connection fitting 154 tightly mounted on a top end of the inner tube 151 and disposed outside the outer tube 153, and a sliding screw nut 152 mounted on an opposing bottom end of the inner tube 151. An threaded through hole 1521 of the screw nut 152 mated with the outer threads of the lead screw 141 and a plurality of longitudinal sliding rails 1522 extruded around the periphery of the screw nut 152 and fitted to the corresponding sliding grooves 1531.

The one-way bearing 2 is mounted in the accommodation chamber 10 inside the housing 11 of the electric actuator 1, consisting of an inner race 21, an outer race 22 surrounding the inner race 21 and supported on the tubular flange 1111 of the housing 11, and a backstop mechanism 23 in between the inner race 21 and the outer race 22. The inner race 21 comprises a flat contact surface 211 at a top side thereof, an axial hole 210 surrounded by the inner race 21 for receiving the bottom end of the gear shaft 122, at least one recessed portion 212 located on an outer surface of the inner race 21 and facing toward the outer race 22, a beveled pushing surface 2121 defined in each recessed portion 212, at least one blind hole 213 respectively disposed corresponding to the recessed portion 212. The backstop mechanism 23 comprises a ball 231 rotatably supported on the beveled pushing surface 2121 in each recessed portion 212, a spring member 233 mounted in each blind hole 213 and a pin 232 supported on each spring member 233 and partially extended out of the associating blind hole 213 and stopped against the periphery of the ball 231 in the associating recessed portion 212. Two annular guide plates 24 are fixedly mounted between the inner race 21 and the outer race 22 at opposing top and bottom sides to guide rotation of each ball 231 and to prohibit each ball 231 from falling out of the one-way bearing 2.

The electric actuator assembly of the present invention can be used in the load which includes an electric bed, electric massage chair, lifter, or a linkage or movable mechanism of a machine or equipment. In application, the first connection fitting 111 and second connection fitting 154 of the main actuator 1 are respectively fixed to the connecting part or supporting frame of the aforesaid mechanism with screws, pins, or other fastening members. The motor 131 is controlled to rotate the output shaft 132 and the meshed drive gear 121, the co-rotating lead screw 141 causing the screw nut 152 and inner tube 151 of the extension rod 15 to move linearly along the sliding grooves 1531 of the outer tube 153, adjusting the relative elevation or angle of the linkage or movable mechanism of the machine or equipment.

To extend the extension rod 15 by moving the inner tube 151 outward the outer tube 153, the least one flat abutment surface 1231 adjacent to stepped friction portion 123 of the gear set 12 will be forced against the flat contact surface 211 at the top side of the inner race 21, rotating the inner race 21 relative to the outer race 22 in one direction (clockwise or counter-clockwise). During this operation, each beveled pushing surface 2121 is moved away the outer race 22 to provide enough room for each ball 231 of the backstop mechanism 23 smooth rotation in each associating recessed portion 212 and stably supported on the associating pin 232 and the associating spring member 233. It yields continuous rotation of the inner race 21 relative to the outer race 22 and the one-way bearing 2 is worked as normal circular bearing.

When turning off the motor 131, the gravity of the load supported on the second connection fitting 154 will intentionally force the screw nut 152 to reversely rotate the lead screw 141 and the gear set 12 and result in lowering the elevation or speeding descent. At this time, each flat abutment surface 1231 of the gear set 12 is still forced against the flat contact surface 211 intending to rotate the inner race 21 in reverse direction related to the outer race 22, and the beveled pushing surface 2121 in each recessed portion 212 is squeezing the ball 231 on the inner face of the outer race 22 to stop rotation of the inner race 21. The one-way bearing 2 is stopping. The friction between the flat abutment surface 1231 and the flat contact surface 211 at the top side of the inner race 21 produces a braking effect, stopping the lead screw 141 from rotating and preventing falling of the linkage or movable mechanism of the machine or equipment that is supported on the second connection fitting 154 of the main actuator 1. When controlling the extension rod 15 to retract, the power output of the motor drive 13 overcomes the friction between the flat abutment surface 1231 of the gear set 12 and the flat contact surface 211 of the one-way bearing 2 and rotate the lead screw 141 in reversed direction to move the inner tube 151 inward the outer tube 153.

The aforesaid one-way bearing 2 is a commercially available mechanical unit of compact size for constraining relative motion between moving parts. Other bearing designs capable of achieving the same braking effect can be selectively used as a substitute. Furthermore, the one-way bearing 2 is easily mounted inside the housing 11 without occupying any space outside the main actuator 1. As a result of less impact on application flexibility and tooling design, the total cost of the main actuator 1 is saved.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An electric actuator assembly comprising:
   an main actuator including a housing which comprises an accommodation chamber therein and two openings located in opposing top and bottom sides thereof, a gear set mounted in said accommodation chamber inside said housing, said gear set comprising a drive gear which contains a gear shaft axially and concentrically extended out of two opposite sides thereof and at least one stepped friction portion located on the periphery thereof, a power drive installed for rotating said gear set, a transmission mechanism comprising a lead screw coupled to said gear set, and an extension rod mated to said lead screw and linearly movable upon rotation of said lead screw; and
   a one-way bearing mounted in said accommodation chamber inside said housing of said main actuator, said one-way bearing consisting of an inner race fitted to said gear shaft of said drive gear, an outer race surrounding said inner race, and a backstop mechanism mounted in between, said inner race comprising a flat contact surface located at a top side thereof for abutting against said at least one stepped friction portion;
   Wherein said power drive rotating said gear set to move said extension rod for lifting a load, said inner race of said one-way bearing is rotated by said gear set relative to said outer race of said one-way bearing in one direction; when the driving power being off, said at least one stepped friction portion of said gear set is abutted against said flat contact surface of said one-way bearing to produce a braking effect.

2. The electric actuator assembly as defined in claim 1, wherein said main actuator further comprises a first connection fitting affixed to the bottom opening of said housing with screws and a tubular flange formed toward inside of said accommodation chamber to stop and support the bottom side of said housing and stopped against a bottom side of said outer race of said one-way bearing.

3. The electric actuator assembly as defined in claim 1, wherein said housing further comprises a locating groove extending around a middle part of an inner perimeter thereof in said accommodation chamber, and an axle bearing mounted in said locating groove to support said gear shaft of said drive gear.

4. The electric actuator assembly as defined in claim 1, wherein said power drive comprises a motor fixedly mounted on the outside of said housing, and an output shaft inserted into said housing and meshed with said drive gear of said gear set and driven by said motor.

5. The electric actuator assembly as defined in claim 1, wherein said gear shaft of said drive gear comprises an axial hole extending through two opposite ends thereof, a plurality of engagement blocks equiangularly located in said axial hole; said lead screw is inserted into said axial hole of said gear shaft of said drive gear comprising a plurality of coupling grooves equiangularly located in the periphery of a bottom end thereof and fitted in with said engagement blocks of said gear shaft of said drive gear.

6. The electric actuator assembly as defined in claim 1, wherein said gear shaft of said drive gear of said gear set further comprises a flat abutment surface adjacent to each said stepped friction portion of said drive gear for abutting against said flat contact surface of said inner race of said one-way bearing.

7. The electric actuator assembly as defined in claim 1, wherein said drive gear of said gear set is made from a plastic material.

8. The electric actuator assembly as defined in claim 1, wherein said extension rod comprises an outer tube which is fixedly mounted in said housing of said main actuator, an axially movable inner tube accommodated in the outer tube, and a sliding screw nut mounted on the bottom end of said inner tube, wherein an threaded through hole of the screw nut mated with the outer threads of the lead screw.

9. The electric actuator assembly as defined in claim 1, wherein said extension rod further comprises a second connection fitting tightly mounted on the top end of said inner tube and disposed outside said outer tube.

* * * * *